(12) United States Patent
Gumpoltsberger

(10) Patent No.: US 7,186,202 B2
(45) Date of Patent: Mar. 6, 2007

(54) MULTI-SPEED GEARBOX

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 164 days.

(21) Appl. No.: 10/518,816

(22) PCT Filed: Jul. 5, 2003

(86) PCT No.: PCT/EP03/07220

§ 371 (c)(1),
(2), (4) Date: Dec. 20, 2004

(87) PCT Pub. No.: WO2004/007996

PCT Pub. Date: Jan. 22, 2004

(65) Prior Publication Data

US 2005/0239593 A1    Oct. 27, 2005

(30) Foreign Application Priority Data

Jul. 11, 2002    (DE) ................................ 102 31 414

(51) Int. Cl.
*F16H 3/62*    (2006.01)
(52) U.S. Cl. ...................................... 475/276
(58) Field of Classification Search ................ 475/275, 475/276
See application file for complete search history.

(56) References Cited

U.S. PATENT DOCUMENTS

| | | |
|---|---|---|
| 4,395,925 A | 8/1983 | Gaus |
| 5,106,352 A | 4/1992 | Lepelletier |
| 5,295,924 A | 3/1994 | Beim |
| 5,342,257 A | 8/1994 | Hotta et al. |
| 5,435,792 A | 7/1995 | Justice et al. |
| 5,455,767 A | 10/1995 | Staerker |
| 5,514,050 A | 5/1996 | Bauerle et al. |

(Continued)

FOREIGN PATENT DOCUMENTS

DE    689 07 338    11/1993

(Continued)

OTHER PUBLICATIONS

Tenberge, Prof. Dr. P., "E-Automat Automatikgetriebe mit Esprit", *VDI-Berichte*, Nr. 1610, VDI Verlag GmbH-Düsseldorf, Germany, Jun. 20, 2001, pp. 455-479.

*Primary Examiner*—Dirk Wright
(74) *Attorney, Agent, or Firm*—Davis Bujold & Daniels, P.L.L.C

(57) ABSTRACT

A multi-step reduction gear includes a drive shaft, output shaft, three single rod planetary gears, seven rotational shafts and six shifting elements, whose selective engagement realizes seven forward gears and one reverse gear, whereby the drive takes place through a shaft, which is continuously connected with the sun wheel of the first planetary gears; the output takes place through a shaft which is connected with the annulus of the second planetary gear set and the annulus of the third planetary gears; a shaft is connected with the annulus of the first planetary gears; a shaft is connected with the rod of the second planetary gears and the rod of the third planetary gears; a shaft is connected with the rod of the first planetary gears; a shaft is connected with the sun wheel of the second planetary gears; a shaft is connected with the sun wheel of the third planetary gears.

23 Claims, 4 Drawing Sheets

U.S. PATENT DOCUMENTS

| | | |
|---|---|---|
| 5,913,746 A | 6/1999 | Bauerle |
| 6,053,839 A | 4/2000 | Baldwin et al. |
| 6,083,135 A | 7/2000 | Baldwin et al. |
| 6,139,463 A | 10/2000 | Kasuya et al. |
| 6,217,474 B1 | 4/2001 | Ross et al. |
| 6,425,841 B1 | 7/2002 | Haka |
| 6,558,287 B2 | 5/2003 | Hayabuchi et al. |
| 6,572,507 B1 | 6/2003 | Korkmaz et al. |
| 6,634,980 B1 | 10/2003 | Ziemer |
| 6,672,987 B1 * | 1/2004 | Raghavan et al. .......... 475/269 |
| 6,723,018 B2 | 4/2004 | Hayabuchi et al. |
| 2003/0054917 A1 | 3/2003 | Raghavan et al. |
| 2003/0083174 A1 | 5/2003 | Tabata et al. |
| 2003/0203784 A1 | 10/2003 | Usoro et al. |
| 2004/0097324 A1 | 5/2004 | Ziemer |
| 2004/0116238 A1 | 6/2004 | Ziemer |
| 2005/0209043 A1 * | 9/2005 | Gumpoltsberger .......... 475/275 |
| 2005/0255958 A1 * | 11/2005 | Tiesler et al. ............... 475/275 |
| 2006/0068965 A1 * | 3/2006 | Gumpoltsberger .......... 475/275 |

FOREIGN PATENT DOCUMENTS

| | | |
|---|---|---|
| DE | 691 16 480 | 6/1996 |
| DE | 199 12 480 A1 | 9/2000 |
| DE | 199 49 507 A1 | 4/2001 |
| DE | 100 43 751 A1 | 6/2001 |
| DE | 102 00 379 A1 | 8/2002 |
| DE | 102 13 820 A1 | 10/2002 |
| DE | 102 50 374 A1 | 6/2003 |
| DE | 102 31 350 A1 | 1/2004 |
| EP | 0 434 525 A1 | 6/1991 |
| EP | 0 378 900 | 6/1993 |
| EP | 1 411 269 A2 | 4/2004 |
| GB | 1 522 616 | 8/1978 |
| JP | 04119245 A | 4/1992 |
| JP | 2000234664 | 8/2000 |
| JP | 2000291747 A | 10/2000 |
| JP | 2001082555 A | 3/2001 |
| JP | 2002323098 A | 11/2002 |
| WO | WO-02/079670 A2 | 10/2002 |
| WO | WO-02/079671 A2 | 10/2002 |
| WO | WO 03/095865 | 11/2003 |

* cited by examiner

| Gear: | 03 | 04 | 14 | 17 | 36 | 56 | i | φ |
|---|---|---|---|---|---|---|---|---|
| 1 | ● | ● |  |  |  | ● | 4.80 | 1.69 |
| 2 | ● | ● |  | ● |  |  | 2.85 | 1.41 |
| 3 | ● |  |  | ● |  | ● | 2.03 | 1.42 |
| 4 | ● |  |  | ● | ● |  | 1.43 | 1.43 |
| 5 | ● |  | ● | ● |  |  | 1.00 | 1.30 |
| 6 | ● |  | ● |  | ● |  | 0.77 | 1.16 |
| 7 | ● |  | ● |  |  | ● | 0.66 | 0.69 |
| R |  | ● |  |  | ● | ● | -3.33 | 7.24 |

MULTI-SPEED GEARBOX

This application is a national stage completion of PCT/EP2003/007220 filed Jul. 5, 2003 which claims priority from German Application Serial No. 102 31 414.4 filed Jul. 11, 2002.

FIELD OF THE INVENTION

The present invention concerns a multi-step reduction gear in planetary construction, especially an automatic transmission for a motor vehicle.

BACKGROUND OF THE INVENTION

Automatic transmissions, especially for motor vehicles, include planetary gears according to the state of the art, which are shifted using friction or shifting elements such as clutches and brakes, and are usually connected with a starting element subject to a slipping action, and are optionally provided with a bridging clutch such as, perhaps, a hydrodynamic torque converter or a fluid clutch.

A transmission of this type emerges from EP 0 434 525 A1. It basically includes a drive shaft and an output shaft, which are arranged parallel to each other, and double planetary gears arranged concentrically in relation to the output shaft, and five shifting elements in the form of three clutches and two brakes, whose selective blockage respectively determines in pairs the different gear reductions between the drive shaft and the output shaft. Hereby, the transmission has a control gears and two power paths, so that six forward gears can be attained through the selective engagement in pairs of the five shifting elements.

Hereby, two clutches are needed in connection with the first power path to transmit the torque from the control gears to two elements of the double planetary gears. These are basically arranged behind the control gears in the direction of the double planetary gears in the direction of the flow of force. A further clutch is provided in connection with the second power path, which detachably connects this with a further element of the double planetary gears. Hereby, the clutches are arranged in such a way, that the internal disk support forms the output.

Furthermore, a compact multi-step reduction gear in planetary construction, especially for a motor vehicle, is known from the publication U.S. Pat. No. 6,139,463, which has two planetary gears, and control gears, as well as three clutches and two brakes. Two clutches C-1 and C-3 are provided with this known multi-step reduction gear in connection with a first power path for transmitting the torque from the control gears to the two planetary gears. Hereby the external disk support, or the cylinder, or the piston, or the pressure compensation side of clutch C-3 is connected with a first brake B-1. Moreover the internal disk support of the third clutch C-3 is connected with the cylinder, or piston, or pressure compensation side of the first clutch C-1, whereby the internal disk support of the first clutch C-1 is arranged on the output side, and is connected with a sun wheel of the third planetary gears.

Moreover, a multi-step reduction gear is known from DE 199 49 507 A1 of the applicant, in which two non-shiftable control gears are provided on the drive shaft, which generate two RPMs on the output side that can, in addition to the RPM of the drive shaft, be shifted electively to shiftable double planetary gears acting on the output shaft through selective closing of the shifting elements used in such a way, that in each case only one shifting element of the two shifting elements just activated must be engaged or disengaged for shifting from one gear into the respectively next following higher or lower gear.

Furthermore, an automatically shiftable motor vehicle transmission with three single rod planetary gears, as well as three brakes and two clutches for shifting six forward gears, and one reverse gear, and with a drive shaft, as well as an output shaft is known from DE 199 12 480 A1. The automatically shiftable motor vehicle transmission is constructed in such a way, that the drive shaft is directly connected with the sun wheel of the second planetary gears, and that the drive shaft can be connected with the sun wheel of the first planetary gears through the first clutch, and/or through the second clutch with the rod of the first planetary gears. In addition or as an alternative, the sun wheel of the first planetary gears can be connected through the first brake with the housing of the transmission, and/or the rod of the first planetary gears through the second brake with the housing, and/or the sun wheel of the third planetary gears through the third brake with the housing.

The present invention is based upon the objective of proposing a multi-step reduction gear of the type named at the beginning, in which the construction expenditure is optimized, and moreover the degree of efficiency in the main driving gears is improved with respect to drag and gearing losses. Moreover, low torques should be acting on the shifting elements and planetary gears in the multi-step reduction gear of the invention, and the RPMs of the shafts, shifting elements and planetary gears should be kept as low as possible. Furthermore, the number of gears as well as the transmission ratio spread should be increased.

SUMMARY OF THE INVENTION

Accordingly, a multi-step reduction gear in planetary construction of the invention is proposed, which has a drive shaft and an output shaft, that are arranged in a housing. Furthermore, at least three single rod planetary gears, at least seven rotational shafts, and at least six shifting elements, including brakes and clutches are provided, whose selective engagement effects various reductions between the drive shaft and the output shaft, so that preferably seven forward gears and one reverse gear can be realized.

In accordance with the present invention, it is provided in connection with the multi-step reduction gear, that the drive takes place through a shaft, which is continuously connected with the sun wheel of the first planetary gears, and such that the output takes place through a shaft, which is connected with the annulus of the second planetary gears, and an element of the third planetary gears. Furthermore, with the multi-step reduction gear of the invention, it is provided, that a third shaft is continuously connected with the rod of the first planetary gears, that a fourth shaft is continuously connected with the rod of the second planetary gears, and a further element of the third planetary gears, that a fifth shaft is continuously connected with a further element of the first planetary gears, that a sixth shaft is continuously connected with the sun wheel of the second planetary gears, and that a further, seventh shaft is continuously connected with the sun wheel of the third planetary gears, whereby the planetary gears are coupled with shafts and shifting elements. Hereby, the drive shaft of the invention can be connected either with the rod, or with the sun wheel of the first planetary gears, whereby the fifth shaft is connected with the sun wheel, or the rod of the first planetary gears.

In the framework of a preferred embodiment, the output shaft is connected with the annulus of the second planetary gears, and the annulus of the third planetary gears, whereby in this case the fourth shaft is connected with the rod of the second and the rod of the third planetary gears, and the first planetary gears and the third planetary gears are constructed as positive planetary gears, and the second planetary gears as negative planetary gears.

In accordance with a further embodiment, the output shaft is connected with the annulus of the second planetary gears and the rod of the third planetary gears, whereby in this case the fourth shaft is connected with the annulus of the third planetary gears and the rod of the secondary planetary gears, and the second and third planetary gears are constructed as negative planetary gears, and the first planetary gears as positive planetary gears.

Several suitable reductions, as well as a considerable increase of the overall ratio spread of the multi-step reduction gear are the result of the configuration of the multi-step reduction gear in accordance with the invention, owing to which, an improvement in driving comfort and a significant reduction in consumption are brought about.

The multi-step reduction gear of the invention is suitable for any motor vehicle, especially for passenger cars and for commercial motor vehicles, such as, for example, trucks, busses, construction vehicles, rail vehicles, caterpillar vehicles and the like.

In addition, the construction expenditure is reduced with the multi-step reduction gear of the invention through a low number of shifting elements, preferably four clutches and two brakes. With the multi-step reduction gear of the invention, it is advantageously possible to conduct a start with a hydrodynamic converter, an external starting clutch or also with other suitable external starting elements. It is also conceivable, to enable a starting procedure with a starting element incorporated into the transmission. Preferably a shifting element, which is activated in first gear and in reverse gears is suitable.

In addition, a good degree of efficiency in the main driving gears is achieved with the multi-step reduction gear of the invention with respect to drag and gearing losses.

Moreover, low torques are present in the shifting elements and the planetary gears of the multi-step reduction gear, owing to which the wear and tear on the multi-step reduction gear is advantageously reduced. Furthermore, a correspondingly small dimensioning is made possible due to the low torques, owing to which, the space required and the corresponding costs can be reduced.

In addition, low RPMs are also present in the shafts, shifting elements and planetary gears.

Furthermore the transmission of the invention is designed in such a way, that an adaptability to different power train configurations in the direction of the flow of force, as well as with respect to space is made possible.

BRIEF DESCRIPTION OF THE DRAWINGS

The invention will now be described, by way of example, with reference to the accompanying drawings in which.

DETAILED DESCRIPTION OF THE INVENTION

Figure 1:
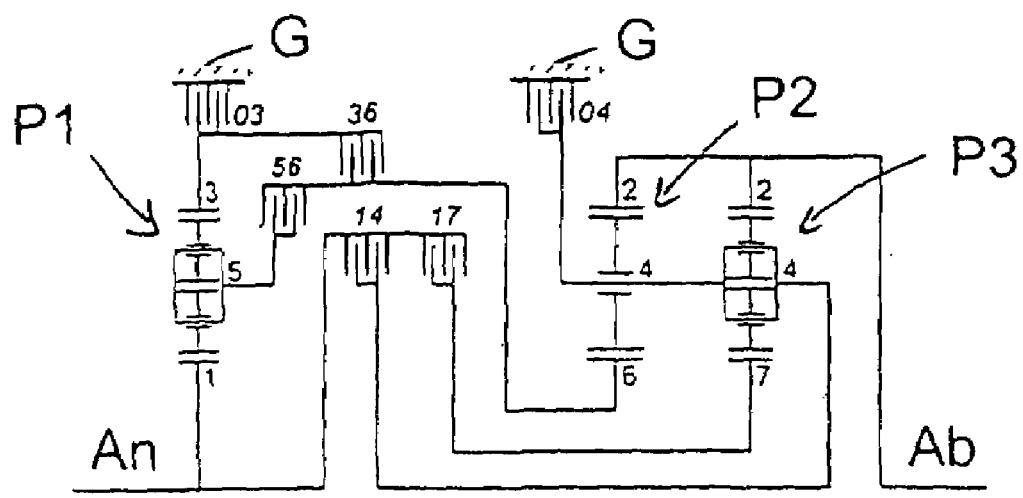
FIG. 1 represents a schematic view of a preferred embodiment of a multi-step reduction gear of the invention.

FIG. 1 shows a multi-step reduction gear transmission of the invention with a drive shaft 1 (An) and an output shaft 2 (Ab), which are arranged in a housing G. Three single rod planetary gears (gear sets) P1, P2, P3 are provided. Hereby, the first planetary gears P1 and the third planetary gears P3 are constructed as positive planetary gears. The second planetary gears P2 is constructed as negative planetary gears in accordance with the invention. It is also possible, that the second planetary gears P2 and the third planetary gears P3 are combined as Ravigneaux planetary gears with common rod (planet carrier) and common annulus.

Figure 2:
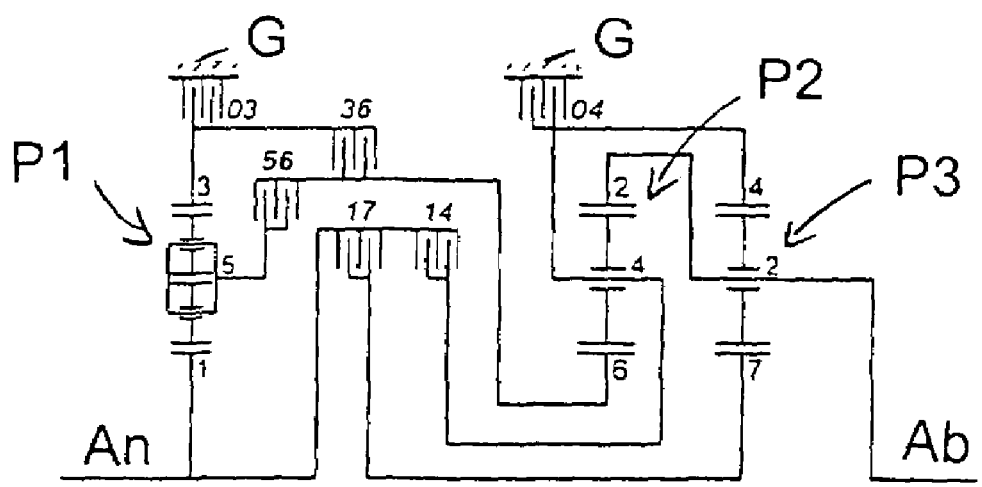
FIG. 2 represents a schematic view of an additional preferred embodiment of a multi-step reduction gear of the invention.

As is apparent from FIGS. 1 and 2, only six switching elements, namely two brakes 03, 04, and four clutches 14, 17, 36 and 56 are provided.

A selective shifting of seven forward gears and a reverse gear can be realized with the shifting elements. The multi-step reduction gear of the invention has a total of seven rotational shafts in accordance with FIG. 1, namely the shafts 1, 2, 3, 4, 5, 6, and 7.

In accordance with the invention, it is provided with the multi-step reduction gear of the invention, according to FIG. 1, that the drive takes place through shaft 1, which is continuously connected with the sun wheel of the first planetary gears P1. The output takes place through shaft 2, which is connected with the annulus of the second planetary gears P2 and the annulus of the third planetary gears P3. Furthermore, shaft 3 is continuously connected with the rod of the first planetary gears; shaft 4 is continuously connected with the rod of the second planetary gears P2 and the rod of the third planetary gears P3. In addition, shaft 5 is continuously connected with the rod of the first planetary gears P1. The additional rotational shaft 6 is continuously connected with the sun wheel of the second planetary gears P2; shaft 7 with the sun wheel of the third planetary gears P3 in accordance with the invention.

With the multi-step reduction gear of the invention, shaft 3 can be coupled onto the housing G through the brake 03 and the shaft 4 through the brake 04. The clutch 14 connects shaft 1 and shaft 3 detachably with one another. Shaft 1 and shaft 7 are detachably connected with each other through clutch 17. Furthermore, clutch 36 detachably connects shafts 3 and 6, and clutch 56 detachably connects shafts 5 and 6 with each other.

A further embodiment of the multi-step reduction gear of the invention is shown in FIG. 2. Hereby, the second planetary gears P2 and the third planetary gears P3 are constructed as negative planetary gears. The first planetary gears P1 are constructed as positive planetary gears in accordance with the invention. A further difference to the embodiment of FIG. 1 consists in that the output shaft 2 is connected with the annulus of the second planetary gears P2 and the rod of the third planetary gears P3, and in that shaft 4 is continuously connected with the rod of the second planetary gears P2 and the annulus of the third planetary gears P3.

Figures 3, 4:
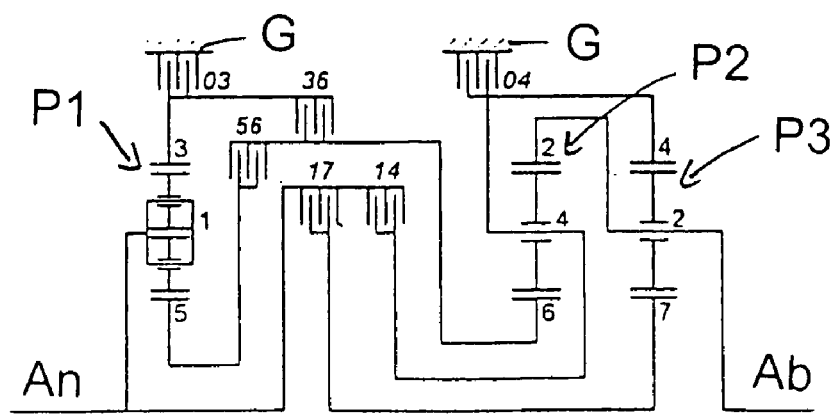
FIG. 3 represents a shifting diagram for the multi-step reduction gear transmission of the invention in accordance with FIG. 1 and FIG. 2.
FIG. 4 represents a schematic view of a further, preferred embodiment of a multi-step reduction gear transmission of the invention.

A shifting diagram of the multi-step reduction gear of the invention in accordance with FIGS. 1 and 2 is represented in FIG. 3. The respective reductions i of the individual gear stages and the stage progressions φ to be determined on their basis can be inferred by way of example. Furthermore, it can be inferred from the shifting diagram, that double shifts can be avoided with sequential modes of shifting, since two adjacent gear steps respectively use two shifting elements in common.

The brake 03 is continuously closed for the seven forwards gears. In addition, brake 04 and clutch 56 are activated for the first gear, for second gear, brake 04 and clutch 17, for the third gear, clutch 17 and clutch 56, for the fourth gear, clutches 17 and 36, for the fifth gear, clutches 14 and 17, for the sixth gear, clutches 14 and 36, and for the seventh gear, clutches 14 and 56. In reverse gear R, brake 04 and clutches 36 and 56 are activated as shift elements.

Within the framework of a further variant of the embodiments shown in FIGS. 1 and 2, the fixed connections of the first planetary gears P1 can be exchanged, so that the shaft 1 is continuously connected with the rod of the first planetary gears P1, and that the shaft 5 is continuously connected with the sun wheel of the first planetary gears P1.

This is shown in FIG. 4 by way of example, in which a transmission is illustrated, which differs from the transmission according to FIG. 2 in that shaft 1 is continuously connected with the rod of the first planetary gears P1, and shaft 5 is continuously connected with the sun wheel of the first planetary gears P1.

Figure 11:
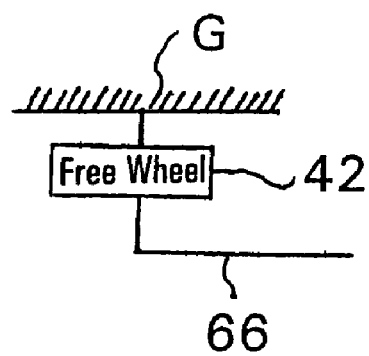
FIG. 11 is a diagrammatic view of the multi-step reduction gear transmission having a free wheel.

It is possible in accordance with the invention, as shown in FIG. 11, to provide a free wheel 42 at each suitable position of the multi-step reduction gear transmission, for example, between a shaft 66 and the housing G or about two shafts if need be.

Figure 5:
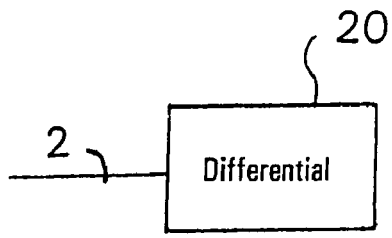
FIG. 5 is a diagrammatic view of an embodiment of the multi-step reduction gear transmission having a differential.

Moreover it is possible through the mode of construction of the invention, to arrange the drive and the output on the same side of the transmission or the housing preferably for transverse, frontal, longitudinal, back longitudinal or all-wheel arrangements. Moreover, an axle differential and/or a distributor differential 20 can be arranged on the drive side or, as show in FIG. 5, on the output side of the transmission.

Figure 6:
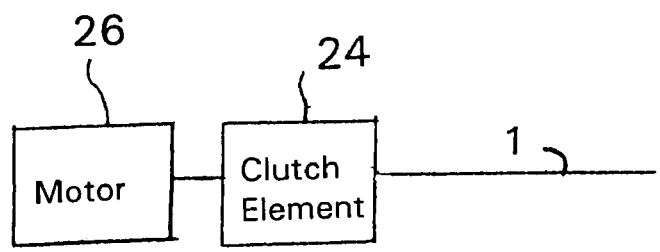
FIG. 6 is a diagrammatic view of an embodiment of the multi-step reduction gear transmission with a clutch element and a motor.
Figure 7:
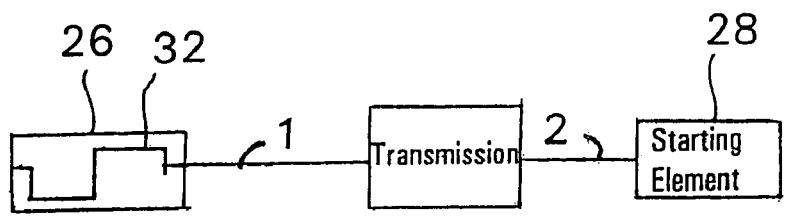
FIG. 7 is a diagrammatic view showing the multi-step reduction gear transmission located between a starting element and a motor.
Figure 8:
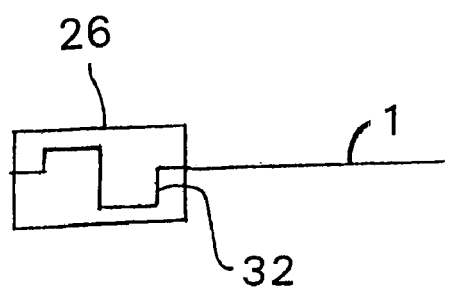
FIG. 8 is a diagrammatic view of the multi-step reduction gear transmission for a front-transverse installation with a motor.

As shown in FIG. 6, the drive shaft 1 can be separated by a clutch element 24 from a drive motor 26 as needed within the framework of an advantageous further development, whereby a hydrodynamic converter, a hydraulic clutch, a dry starting clutch, a wet starting clutch, a magnetic powder clutch, or a centrifugal force can be used as the clutch element. It is also possible to arrange a starting element 28, as show in FIG. 7, of this type behind the transmission in the flow of force direction, whereby in this case the drive shaft 1 is continuously connected with the crankshaft 32 of the motor 26. Additionally, the drive shaft 1 can be permanently connected with the crankshaft 32 of an engine or drive motor 26, as show in FIG. 8. Starting up according to the invention, can take place using a shifting element of the transmission. Preferably the brake 04, which is activated in the first forward gear, as well as in the first reverse gear, can be used.

Figure 9:
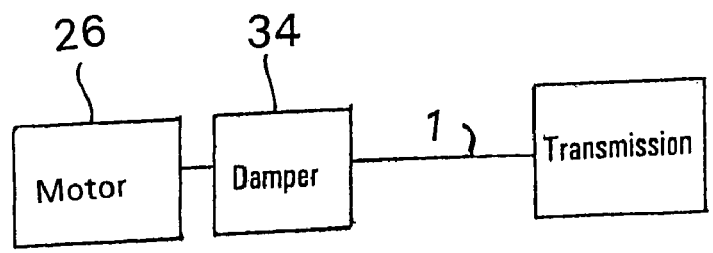
FIG. 9 is a diagrammatic view of an embodiment of the inventive multiple gear transmission having a motor and a damper.

The multi-step reduction gear transmission of the invention moreover enables the arrangement of a torsion vibration damper 34 between the motor 26 and the transmission, as shown in FIG. 9.

Figure 10:
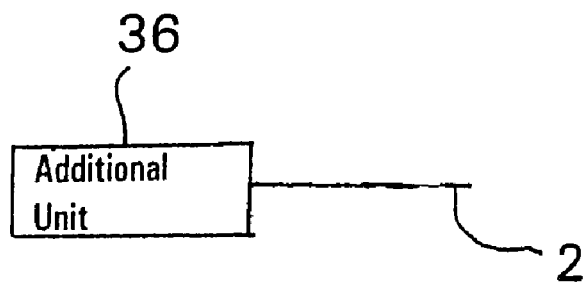
FIG. 10 is a diagrammatic view of the multi-step reduction gear transmission with a power take off for an additional unit.
Figure 13:
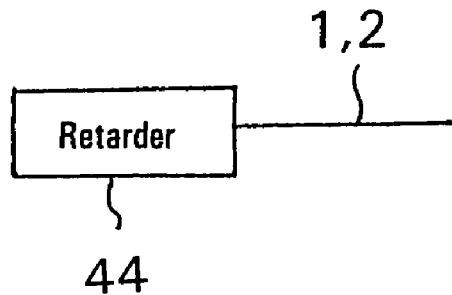
FIG. 13 is a diagrammatic view of the multi-step reduction gear transmission having a retarder.

A wear-free brake 44, as shown in FIG. 13, such as, for example, a hydraulic or electric retarder or the like, can be arranged on any shaft, preferably on the drive shaft 1 or the output shaft 2, which is especially of significance for use in commercial motor vehicles within the framework of a further, not represented embodiment. Furthermore, as shown in FIG. 10, an auxiliary output can be provided preferably on the drive shaft 1 or the output shaft 2 for driving an additional unit 36 on each shaft.

The shifting elements used can be constructed as load-shifting clutches or brakes. In particular, force-locking clutches or brakes such as, for example, disk clutches, strap brakes and/or cone clutches can be used. Furthermore, form-locking brakes and/or clutches, such as, for example, synchronizations or claw clutches, can be used as shifting elements.

Figure 12:
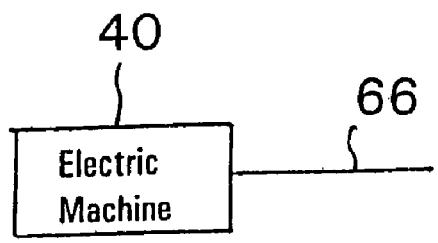
FIG. 12 is a diagrammatic view of the multi-step reduction gear transmission with an electric machine.

A further advantage of the multi-step reduction gear transmission presented here, as show in FIG. 12, consists in that an electric machine 40 can be installed on each shaft 66 as generator and/or as additional drive machine.

The functional features of the claims can be constructionally built in the most different types of ways. These constructional development possibilities are not being explicitly described for the sake of simplicity. Obviously each constructional development of the invention nonetheless falls under the scope of protection of the claims, especially any spatial arrangement of the planetary gears or the shifting elements in themselves or toward one another and to the extent to which they are technically appropriate.

REFERENCE NUMBER 1 shaft
2 shaft
3 shaft
4 shaft
5 shaft
6 shaft
7 shaft
03 brake
04 brake
14 clutch
17 clutch
36 clutch
56 clutch
P1 planetary gears
P2 planetary gears
P3 planetary gears
An drive
Ab output
i reduction
φ step progression
G housing

The invention claimed is:

1. A multi-step reduction gear transmission of a planetary construction for a motor vehicle, the multi-step reduction gear transmission including:
 a drive shaft (1) and an output shaft (2) which are arranged in a housing (G),
 first, second and third planetary gear sets (P1, P2, P3),
 at least third, fourth, fifth, six and seventh shafts (3, 4, 5, 6, 7), as well as at least six shifting elements (03, 04, 14, 17, 36, 56), including brakes and clutches, whose selective engagement achieves different gear ratios between the drive shaft (1) and the output shaft (2) so that seven forward gears and one reverse gear can be realized, drive takes place through the drive shaft (1) which is continuously connected with a first element of the first planetary gear set (P1), an output takes place through the output shaft (2) which is continuously in connection with an annulus of the second planetary gear set (P2) and one element of the third planetary gear set (P3), the third shaft (3) is continuously connected with an annulus of the first planetary gear set (P1), the fourth shaft (4) is continuously connected with a planet carrier of the second planetary gear set (P2) and a further element of the third planetary gear set (P3), the fifth shaft (5) is continuously connected with a further element of the first planetary gear set (P1), the sixth shaft (6) is continuously connected with a sun wheel of the second planetary gear set (P2), the seventh shaft (7) is continuously connected with a sun wheel of the third planetary gear set (P3), whereby the third shaft (3) can be coupled to the housing (G) via a first brake (03), the fourth shaft (4) can be coupled to the housing (G) via a second brake (04), a first clutch (14) detachably connects the first shaft (1) and the fourth shaft (4) with one another, a second clutch (17) detachably connects the first shaft (1) and the seventh shaft (7) with one another, a third clutch (36) detachably connects the third shaft (3) and the sixth shaft (6) with one another, and a fourth clutch (56) detachably connects the fifth shaft (5) and the sixth shaft (6) with one another.

2. The multi-step reduction gear transmission according to claim 1, wherein the drive shaft (1) is continuously connected with the sun wheel of the first planetary gear set (P1) and the fifth shaft (5) is continuously connected with a planet carrier of the first planetary gear set (P1).

3. The multi-step reduction gear transmission according to claim 1, wherein the drive shaft (1) is continuously connected with a planet carrier of the first planetary gear set (P1) and the fifth shaft (5) is continuously connected with the sun wheel of the first planetary gear set (P1).

4. The multi-step reduction gear transmission according to claim 1, wherein the output shaft (2) is connected with the annulus of the second planetary gear set (P2) and an annulus of the third planetary gear set (P3), and the fourth shaft (4) is continuously in connection with the planet carrier of the second planetary gear set (P2) and a planet carrier of the third planetary gear set (P3), whereby the first planetary gear set (P1) and the third planetary gear set (P3) are each positive planetary gear sets and the second planetary gear set (P2) is a negative planetary gear set.

5. The multi-step reduction gear transmission according to claim 4, wherein the second planetary gear set (P2) and the third planetary gear set (P3) are combined as a Ravigneaux planetary gear with a common planet carrier and a common annulus.

6. The multi-step reduction gear transmission according to claim 1, wherein the second shaft (2) is connected with the annulus of the second planetary gear set (P2) and a planet carrier of the third planetary gear set (P3), and the fourth shaft (4) is continuously connected with the planet carrier of the second planetary gear set (P2) and an annulus of the third planetary gear set (P3), whereby the second planetary gear set (P2) and the third planetary gear set (P3) are each negative planetary gear sets, and the first planetary gear set is a positive planetary gear set.

7. The multi-step reduction gear transmission according to claim 1, wherein the multi-step reduction gear includes a free wheel.

8. The multi-step reduction gear transmission according to claim 7, wherein the free wheel is provided between one of the drive, the output, the third, the fourth, the fifth, the sixth and the seventh shafts (1, 2, 3, 4, 5, 6, 7) and the housing (G).

9. The multi-step reduction gear transmission according to claim 1, wherein the drive and the output are provided on a same side of the housing.

10. The multi-step reduction gear transmission according to claim 1, wherein at least one of an axle and a distributor differential is arranged on a drive side or an output side.

11. The multi-step reduction gear transmission according to claim 1, wherein the drive shaft (1) is separable from a drive motor by a clutch element.

12. The multi-step reduction gear transmission according to claim 11, wherein the clutch element is one of a hydrodynamic converter, a hydraulic clutch, a dry starting clutch, a wet starting clutch, a magnetic powder clutch and a centrifugal clutch.

13. The multi-step reduction gear transmission according to claim 12, wherein an external starting element is arranged downstream of the multi-step reduction gear transmission in a direction of a power flow through the multi-step reduction gear transmission, whereby the drive shaft (1) has a fixed connection with a crankshaft of the motor.

14. The multi-step reduction gear transmission according to claim 1, wherein starting takes place using one of the at least six shifting elements (03, 4, 14, 17, 36, 56) of the multi-step reduction gear transmission, whereby the drive shaft (1) is continuously connected with a crankshaft of a motor.

15. The multi-step reduction gear transmission according to claim 14, wherein one of the fourth clutch (56) and the second brake (04) is used as a shifting element.

16. The multi-step reduction gear transmission according to claim 1, wherein a torsion vibration damper is arranged between a motor and the multi-step reduction gear transmission.

17. The multi-step reduction gear transmission according to claim 1, wherein a wear-free brake is arranged on at least one of the drive, the output, the third, the fourth, the fifth, the sixth and the seventh shafts.

18. The multi-step reduction gear transmission according to claim 1, wherein an auxiliary output is arranged on at least one of the drive, the output, the third, the fourth, the fifth, the sixth and the seventh shafts for driving an additional unit.

19. The multi-step reduction gear transmission according to claim 18, wherein the auxiliary output is arranged on one of the drive shaft (1) and the output shaft (2).

20. The multi-step reduction gear transmission according to claim 1, wherein the shifting elements are one of load-shifting clutches and brakes.

21. The multi-step reduction gear transmission according to claim 20, wherein one of disk clutches, strap brakes and cone clutches are used as the shifting elements.

22. The multi-step reduction gear transmission according to claim 1, wherein one of form-locking brakes and clutches are used as the shifting elements.

23. The multi-step reduction gear transmission according to claim 1, wherein an electrical machine is installed on at least one of the drive, the output, the third, the fourth, the fifth, the sixth and the seventh shafts as one of a generator and as an additional drive machine.

* * * * *